(12) United States Patent
Lee et al.

(10) Patent No.: US 12,379,463 B2
(45) Date of Patent: Aug. 5, 2025

(54) RADAR DEVICE AND CONTROL METHOD

(71) Applicant: HL KLEMOVE CORP., Incheon (KR)

(72) Inventors: Han Byul Lee, Seoul (KR); Jingu Lee, Ansan-si (KR); Jae Hyun Han, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 417 days.

(21) Appl. No.: 17/506,129

(22) Filed: Oct. 20, 2021

(65) Prior Publication Data

US 2022/0120853 A1   Apr. 21, 2022

(30) Foreign Application Priority Data

Oct. 20, 2020   (KR) .......................... 10-2020-0136180

(51) Int. Cl.
*G01S 13/931*   (2020.01)
*G01S 7/35*   (2006.01)
(Continued)

(52) U.S. Cl.
CPC ............ *G01S 7/356* (2021.05); *G01S 7/4091* (2021.05); *G01S 13/32* (2013.01); *G01S 13/931* (2013.01)

(58) Field of Classification Search
CPC ........ G01S 7/356; G01S 13/32; G01S 13/931; G01S 7/403; G01S 7/4091; G01S 13/343; G01S 13/42; G01S 13/584; G01S 7/4004; G01S 7/2883; G01S 13/68; G01S 7/35; G01S 7/352; G01S 7/354; G01S 7/40;
(Continued)

(56) References Cited

U.S. PATENT DOCUMENTS

| 7,755,543 B2 * | 7/2010 | Yoo ......................... G01S 19/40 |
| | | 342/357.23 |
| 9,562,961 B1 * | 2/2017 | Baker ....................... G01S 3/50 |

(Continued)

FOREIGN PATENT DOCUMENTS

| KR | 20140088683 A * | 1/2013 | ............. G01S 13/92 |
| KR | 10-2014-0088683 A | 7/2014 | |

(Continued)

OTHER PUBLICATIONS

Foreign Reference (Year: 2019).*
Office Action dated Oct. 18, 2024 for corresponding Korean Patent Application No. 10-2020-0136180, along with an English translation (13 pages).

*Primary Examiner* — Vladimir Magloire
*Assistant Examiner* — Remash R Guyah
(74) *Attorney, Agent, or Firm* — Hauptman Ham, LLP (57) ABSTRACT

The disclosure relates to a radar device and a control method. Specifically, according to the disclosure, a radar device comprises a transmitter controlling to transmit a frequency-modulated transmission signal, a receiver receiving a reception signal which is the transmitted transmission signal reflected by an object, an angle estimator estimating a first angle for a position of the object, with respect to a host vehicle, during one frame, based on a result obtained by performing fast Fourier transform (FFT) on the reception signal and estimating a second angle which is a virtual angle for the position of the object during a plurality of frames, and a controller calibrating the first angle by comparing the estimated first angle and the estimated second angle.

20 Claims, 9 Drawing Sheets

(51) Int. Cl.
*G01S 7/40* (2006.01)
*G01S 13/32* (2006.01)

(58) Field of Classification Search
CPC .. G01S 13/34; G01S 13/58; G01S 2013/9375; G01S 7/415; G01S 13/582; G01S 13/589; G01S 2013/0245; G01S 13/865; G01S 13/867; G01S 13/345; G01S 13/88; G01S 7/003; G01S 13/4454
USPC ..... 342/70, 71, 72, 107, 109, 115, 118, 128, 342/133, 139, 146, 189, 195, 162
See application file for complete search history.

(56) References Cited

U.S. PATENT DOCUMENTS

| | | | |
|---|---|---|---|
| 2009/0212999 A1* | 8/2009 | Yoo | G01S 19/40 701/469 |
| 2017/0363737 A1* | 12/2017 | Kaino | G01S 13/345 |
| 2019/0187250 A1* | 6/2019 | Ru | G01S 7/4052 |
| 2021/0132212 A1* | 5/2021 | Brosche | G01S 13/589 |
| 2022/0221570 A1* | 7/2022 | Zhu | G01S 7/2883 |

FOREIGN PATENT DOCUMENTS

| | | | | |
|---|---|---|---|---|
| KR | 10-1478182 B1 | | 1/2015 | |
| WO | WO-2021062750 A1 * | | 4/2021 | ........... G01S 13/343 |

* cited by examiner

RADAR DEVICE AND CONTROL METHOD

CROSS REFERENCE TO RELATED APPLICATION

This application claims priority from Korean Patent Application No. 10-2020-0136180, filed on Oct. 20, 2020, which is hereby incorporated by reference for all purposes as if fully set forth herein.

BACKGROUND

Field

The disclosure relates to a radar device and a control method, and more specifically, to a radar device that detects an object by receiving a radar signal and a control method.

Description of Related Art

Many advanced driver assistance systems (ADASs) for controlling a vehicle using a radar device for detecting surrounding objects have been recently developed. In order for such driver assistance system to perform accurate vehicle control, accurate object detection by the radar device is essential.

Meanwhile, angular accuracy in radar is very important for stable detection performance. Radar operates with specific periodicity. if tunnels, guardrails, or other road environments are complicated in extracting the range, velocity, or angle to detect a target at each period, angular information may be distorted due to multiple paths or may be changed from the actual angle of the target due to an overlap with the frequency of the signal of another object.

If the angular information is changed from the actual angle of the target, the driver assistance system, e.g., adaptive cruise control (ACC) or smart cruise control (SCC), may make an erroneous determination. For example, if another vehicle continues to travel ahead of the host vehicle, and the radar equipped in the host vehicle detects the other vehicle as traveling in another position, the driver assistance system and the driver may determine that there is no vehicle traveling ahead of the host vehicle and may make a different determination from the actual situation.

Accordingly, there is a need for a method for accurately determining the angle of an object around the host vehicle in a structure having high reflective characteristics, such as a guard rail and a tunnel wall.

BRIEF SUMMARY

In the background, there are provided a radar device and a control method that calibrate a first angle by comparing the first angle for an object, estimated based on a reception signal reflected by the object, and a second angle, which is a virtual angle for the object.

To achieve the foregoing objectives, according to an aspect of the disclosure, there is provided a radar device comprises a transmitter controlling to transmit a frequency-modulated transmission signal, a receiver receiving a reception signal which is the transmitted transmission signal reflected by an object, an angle estimator estimating a first angle for a position of the object, with respect to a host vehicle, during one frame, based on a result obtained by performing fast Fourier transform (FFT) on the reception signal and estimating a second angle which is a virtual angle for the position of the object during a plurality of frames, and a controller calibrating the first angle by comparing the estimated first angle and the estimated second angle.

According to another aspect of the disclosure, there is provided a radar control method, comprising a transmission/reception step controlling to transmit a frequency-modulated transmission signal and receive a reception signal which is the transmitted transmission signal reflected by an object, an angle estimation step estimating a first angle for a position of the object, with respect to a host vehicle, during one frame, based on a result obtained by performing fast Fourier transform (FFT) on the reception signal and estimating a second angle which is a virtual angle for the position of the object during a plurality of frames, and an angle calibration step calibrating the first angle by comparing the estimated first angle and the estimated second angle.

According to the disclosure, the radar device and the control method may enhance the accuracy for the first angle by comparing the first angle estimated from a single frame and the second angle estimated from a plurality of frames to thereby calibrate the first angle.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a radar device 10 according to an embodiment of the disclosure is described with reference to the accompanying drawings.

Figure 1:
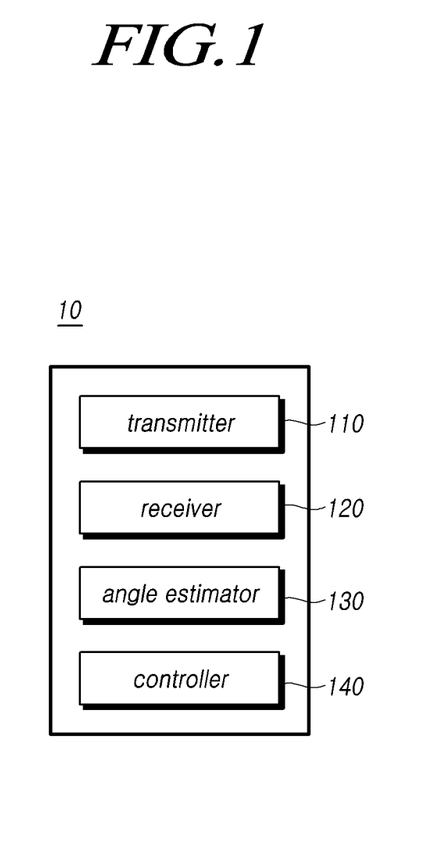
FIG. 1 is a block diagram schematically illustrating a radar device according to an embodiment of the disclosure.

FIG. 1 is a block diagram schematically illustrating a radar device 10 according to an embodiment of the disclosure.

Figure 5:
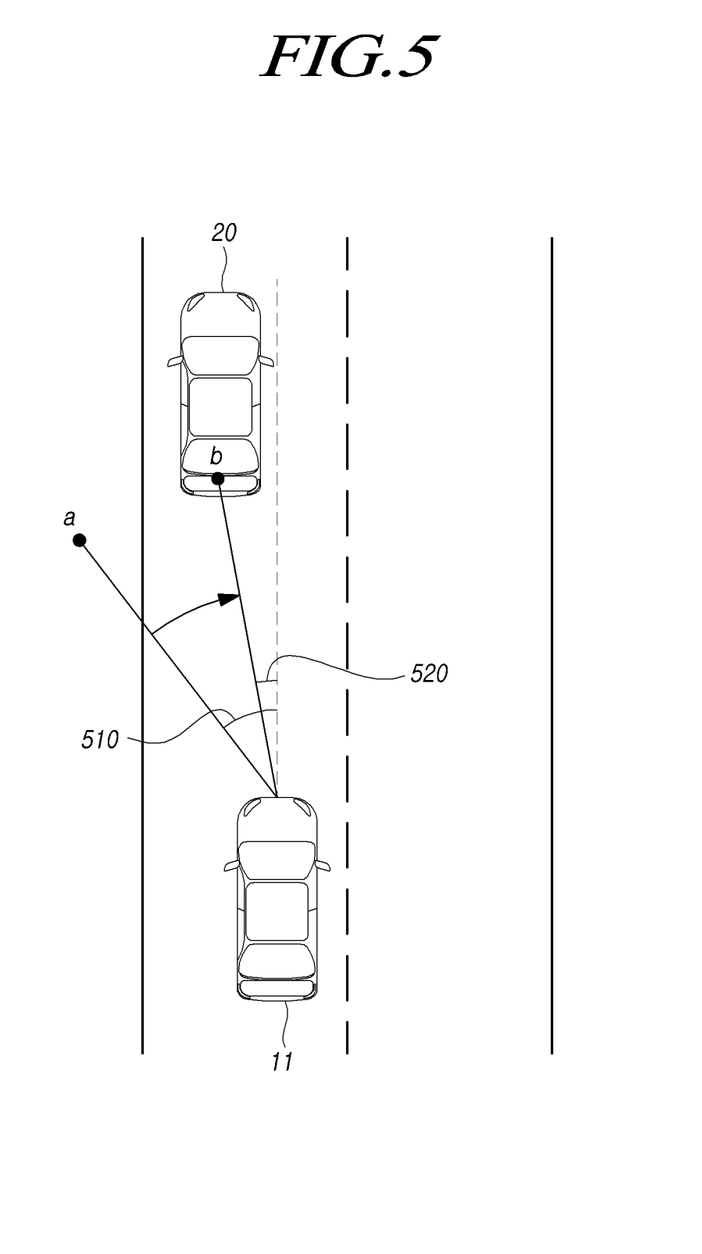
FIGS. 5 and 6 are views illustrating an example of calibrating a first angle by comparing the first angle and a second angle according to an embodiment.

Referring to FIGS. 1 and 5, according to an embodiment of the disclosure, a radar device 10 may include a transmitter 110, a receiver 120, an angle estimator 130, and a controller 140.

The radar device 10 may control to transmit a frequency-modulated transmission signal and receive the reception signal, which is the transmission signal reflected from an object 20. The radar device 10 may estimate a first angle 510 for the position of the object 20 with respect to the host vehicle 11 based on the result obtained by performing fast Fourier transform (FFT) on the reception signal, estimate a second angle 520 which is a virtual angle for the position of the object 20 based on a range-velocity index calculated during a plurality of frames, and compare the estimated first angle 510 and the estimated second angle 520 to thereby calibrate the first angle 510.

As described above, the radar device 10 may enhance the accuracy for the first angle 510 by comparing the first angle 510 estimated based on one frame with the second angle 520 which is the virtual angle estimated based on a plurality of frames.

The transmitter 110 may control to transmit a frequency-modulated transmission signal. Specifically, the transmitter 110 may control a radar module equipped in the host vehicle 11 to transmit a transmission signal. The radar module may be provided in the host vehicle 11 to transmit radar signals forward or rearward of the host vehicle 11 and may transmit frequency-modulated transmission signals for a predetermined period. For example, the radar module may be a fast ramp frequency modulation continuous waveform (FMCW) radar. The radar module may generate signals in an FMCW scheme that linearly changes the transmission frequency. Further, the radar module may transmit transmission signals in a fast chirp scheme.

Although the FMCW has been described in the disclosure, known technology that may estimate the angle for the position of the object 20 by reflecting by the object 20 around the host vehicle 11 may be applied, and embodiments of the disclosure are not limited to specific signals.

The receiver 120 may receive reception signals that are transmission signals from the transmitter 110 and reflected within a predetermined detection range. The receiver 120 may receive the reception signal which is the transmission signal reflected by the object 20.

The reception signal reflected by the object 20 may be received by the radar module, and the radar module may transmit information for the reception signal to the receiver 120.

The radar module may include a plurality of antennas, and each antenna may transmit the transmission signal or receive the reception signal. Such a radar module may be an array antenna. The radar module is not limited to a specific antenna type or array as long as it is able to transmit the transmission signal or receive the reception signal.

The angle estimator 130 may estimate the first angle 510 for the position of the object 20 with respect to the host vehicle 11 during one frame based on the result obtained by performing fast Fourier transform (FFT) on the reception signal received by the receiver 120 and estimate the second angle 520 which is a virtual angle for the position of the object 20 during a plurality of frames.

Figure 2:
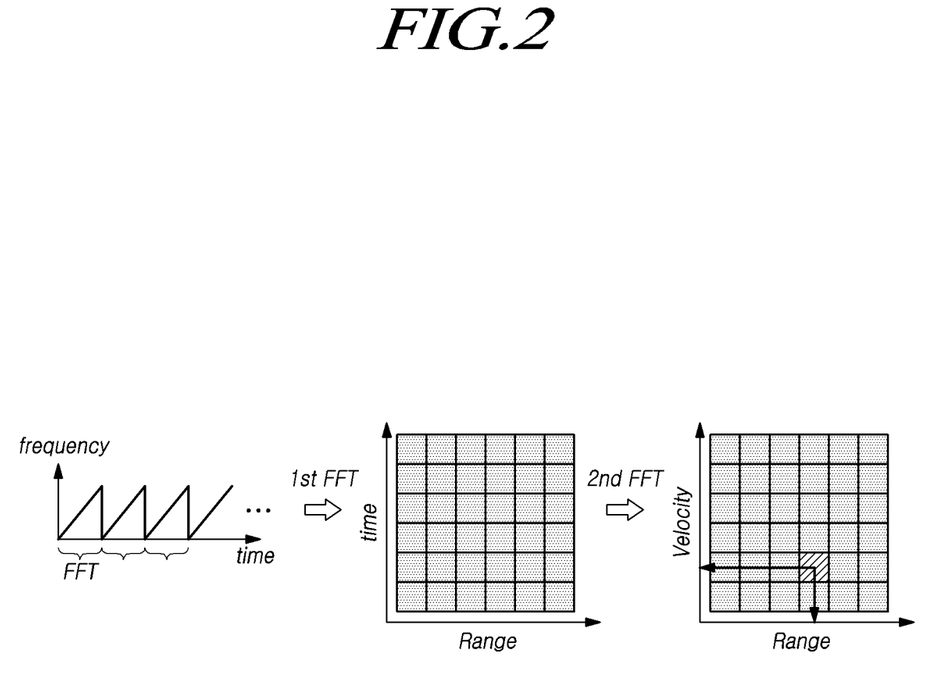
FIG. 2 is a view illustrating an example of performing FFT on a reception signal according to an embodiment.

FIG. 2 is a view illustrating an example of performing FFT on a reception signal according to an embodiment.

Figure 4:
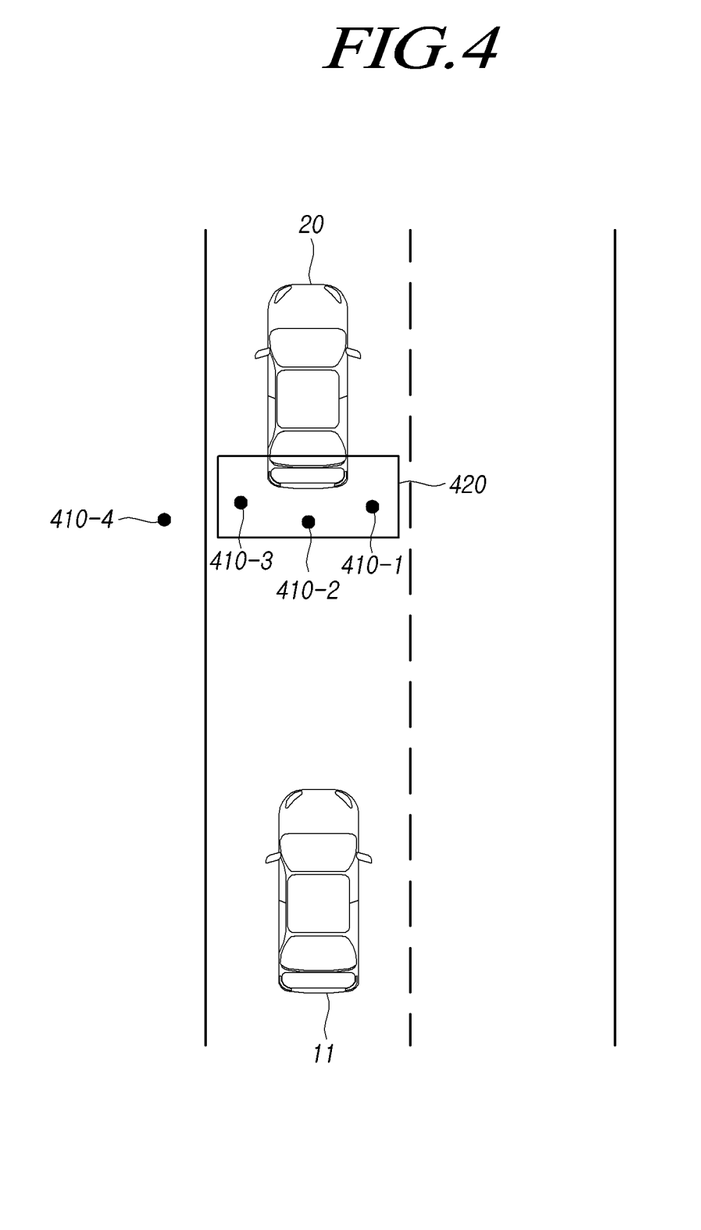
FIG. 4 is a view illustrating an example of estimating an angle for an object based on measurements included in an object candidate group area according to an embodiment.

Referring to FIGS. 2, 4 and 5, the angle estimator 130 may obtain a range-velocity index by performing FFT on the reception signal and estimate the first angle 510 and the second angle 520 for the object 20 based on the range-velocity index.

Specifically, the angle estimator 130 may convert the reception signal into the range-time index by performing primary FFT on the frequency and convert it into the range-velocity (Doppler) index by performing secondary FFT on the time. Accordingly, the angle estimator 130 may receive the frequency and obtain the range and velocity components.

A time from the transmission of the transmission signal to retransmission of the transmission signal after analyzing the reception signal reflected by the object and received, and receiving information for the reception signal may be defined as the frame. The angle estimator 130 may estimate the first angle 510 and the second angle 520 based on the above-described frame. By the nature of the vehicle which travels fast, one frame may be a very short time. For example, for a regular vehicle radar module, one frame may be 50 ms or less. However, without being limited thereto, embodiments of the disclosure are not limited to a certain period or scheme as long as it is able to transmit/receive radar signals and obtain information capable of estimating angle from the reception signal.

The reception signal may include a plurality of measurements 410. The measurements 410 may be the results received from the same number of antennas as the plurality of measurements 410, which are included in the radar module.

Referring to the following table, the angle estimator 130 may extract channel data based on the reception signal. The channel data may include range-velocity index values obtained by performing FFT on the reception signal in the corresponding frame.

TABLE 1

| Frame Num. | 1 | 2 | 3 | ... | N − 1 | N |
|---|---|---|---|---|---|---|
| R-D index | $(R_1, D_1)$ | $(R_2, D_2)$ | $(R_3, D_3)$ | ... | $(R_{N-1}, D_{N-1})$ | $(R_N, D_N)$ |
| Channel data | $X_1$ | $X_2$ | $X_3$ | ... | $X_{N-1}$ | $\theta_N$ |
| Estimated angle | $\tilde{\theta}_1$ | $\tilde{\theta}_2$ | $\tilde{\theta}_3$ | ... | $\tilde{\theta}_{N-1}$ | $\tilde{\theta}_N$ |

For example, channel data corresponding to an ith frame may be defined as a row vector or a column vector as follows.

$$X_i = [X_{i,1}, X_{i,1}, \ldots, X_{i,M}]$$

$$X_i = [X_{i,1}, X_{i,1}, \ldots, X_{i,M}]^T$$

Here, M is the number of antennas, and T may mean transpose.

The angle $\tilde{\theta}_i$ estimated for the position of the object 20 may be calculated based on the channel data $X_i$ for the ith frame, in the ith frame, with respect to the host vehicle 11. Here, $\tilde{\theta}_i$ is the estimated angle for a single frame and may be defined as the first angle 510. Further, the number of measurements 410 included in the ith frame may be the same as the number of antennas for receiving reception signals from the radar module. In other words, if there are M antennas, M measurements 410 of the ith frame may be calculated.

Next, referring to the table below, the second angle 520 may be calculated from the reception signals received in a plurality of frames.

TABLE 2

| Frame Num. | 1 | 2 | 3 | ... | N − 1 | N |
|---|---|---|---|---|---|---|
| 가상 Channel data | $X_{v,1}$ | $X_{v,2}$ | $X_{v,3}$ | ... | $X_{v,N-1}$ | $X_{v,N}$ |
| Estimated angle | $\tilde{\theta}_{v,1}$ | $\tilde{\theta}_{v,2}$ | $\tilde{\theta}_{v,3}$ | ... | $\tilde{\theta}_{v,N-1}$ | $\tilde{\theta}_{v,N}$ |

The virtual channel data may include channel data included in the frames from the frame where it is to be calculated to the prior kh frame.

For example, virtual channel data of the ith frame may be defined as a row vector and a column vector as follows.

$$X_{v,i} = [X_{i-k} X_{i-k+1} \ldots, X_i]$$

$$X_{v,i} = [X_{ik} X_{i1}, \ldots, X_i]^T$$

Here, for the virtual channel data, it may be set how many frames of channel data is included from the ith frame according to k. The angle $\tilde{\theta}_{v,i}$ estimated for the position of the object 20 may be calculated based on the virtual channel data $X_{v,i}$ for the ith frame, in the ith frame, with respect to the host vehicle 11.

The second angle 520 may be calculated based on channel data included according to the aforementioned k value. In an embodiment, the second angle 520 may be calculated as an average of the angles estimated from each channel data included in the virtual channel data.

That is, the second angle may be calculated as an average of angles for the object estimated in each frame among the plurality of frames. Alternatively, the second angle may be an average calculated by excluding the largest angle and the smallest angle among the angles estimated in each of the plurality of frames.

Accordingly, the controller, which will be described later, may calibrate the first angle to the second angle that is an average of angles calculated in each of the plurality of frames.

In another embodiment, in a case where the plurality of frames include N frames, and the angle for the object 20 estimated for each of the Nth frame, N−1th frame, and N−2th frame is increased or decreased while maintaining a predetermined value, the angle for the object 20 estimated in the Nth frame may be estimated as the second angle 520.

The above-described first angle 510 and second angle 520 may estimate the angle for the object 20 based on the channel data included in each frame.

Figure 3:
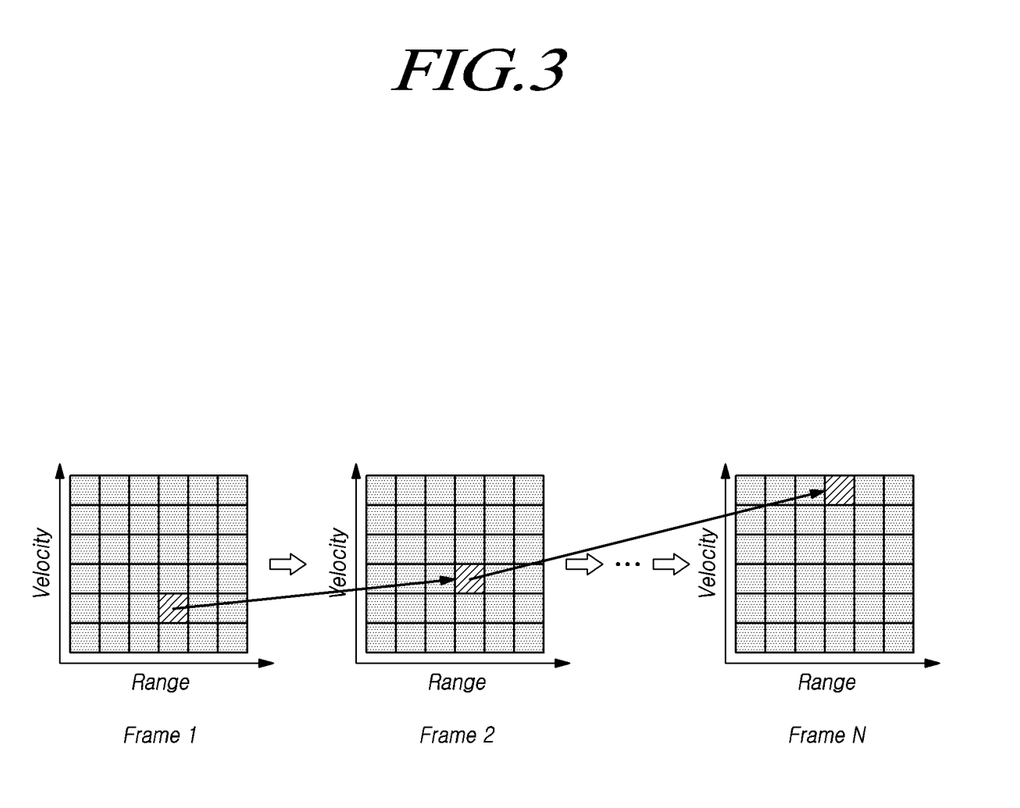
FIG. 3 is a view illustrating an example of calculating a measurement through a time-range index according to an embodiment.

FIG. 3 is a view illustrating an example of calculating a measurement 410 through a time-range index according to an embodiment.

Referring to FIGS. 3, 4 and 5, if the range-time component per frame of the measurement 410 is varied by a predetermined reference value or more, the angle estimator 130 may estimate the second angle 520 except for the measurement 410.

Specifically, since one frame is typically set to a short time (50 ms), the variation in the range-velocity value of the measurement 410 during a plurality of frames may not be significant. Therefore, if the range-velocity value for a specific measurement 410 is varied by a predetermined reference value or more during the consecutive frames included in the virtual channel data, it may be determined that the information for the position of the object 20 has not been precisely reflected, so that it may be excluded from the measurement 410.

Further, if the velocity is increased while the range stays constant as frames continue as illustrated in FIG. 3, it may be determined whether to exclude the measurement 410 considering the velocity of the host vehicle 11. This is why if the host vehicle 11 is traveling and the object 20 is traveling at the same velocity, in a case where the host vehicle 11 increases the velocity, the velocity may increase while the range remains the same. For this determination, the angle estimator 130 may receive the information for the velocity of the host vehicle 11 from a vehicle velocity sensor equipped in the host vehicle 11.

As described above, the radar device 10 may estimate the angle based on the valid measurement 410, thereby enhancing the accuracy of the estimated angle.

FIG. 4 is a view illustrating an example of estimating an angle for an object 20 based on measurements 410-1, 410-2, 410-3, and 410-4 included in an object (20) candidate group area according to an embodiment.

Referring to FIG. 4, the angle estimator 130 may estimate the angle for the object 20 based on the measurements 410-1, 410-2, and 410-3 included in a preset object candidate area 420 among the measurements 410-1, 410-2, 410-3, and 410-4 included in the received reception signal. The angle estimator 130 may previously set an object candidate area 420. For example, the angle estimator 130 may set the lane where the host vehicle 11 is traveling as the object candidate area 420. The angle estimator 130 may receive the information for the object 20 from the image sensor equipped in the host vehicle 11 and set the object candidate area 420 based thereupon. The object candidate area 420 may be set to include the object 20. In an embodiment, the angle estimator 130 may set the object candidate area 420 based on a track set for the object 20.

If the number of measurements 410 included in the object candidate area 420 is reduced to a predetermined number over time, the angle estimator 130 may set the object candidate area 420 while on the move. For example, if the number of measurements 410 included in the object candidate area 420 in one frame is five, and the number of measurements 410 included in the object candidate area 420 is reduced to 4, 3, and 2 as times goes to two frames, three frames, and four frames, the angle estimator 130 may determine that the object 20 is moving and set the object candidate area 420 to move. In this case, the object candidate area 420 may be moved in any direction, e.g., up, down, left, or right. Preferably, the object candidate area 420 may be moved in the direction in which the number of measurements 410 included in the object candidate area 420 increases. If the number of measurements 410 included in the object candidate area 420 increases as the object candidate area 420 moves, the angle estimator 130 may determine that the object 20 has moved in the moving direction of the object candidate area 420.

In the movement of the object candidate area 420, the angle estimator 130 may set the object candidate area 420 to move based on the information obtained by detecting the object 20 in the image sensor. The reference of the time when the number of measurements 410 included in the object candidate area 420 is reduced may be set on a per-frame basis and may be varied depending on the traveling situation, the driver's propensity, and ambient environment.

Figure 6:
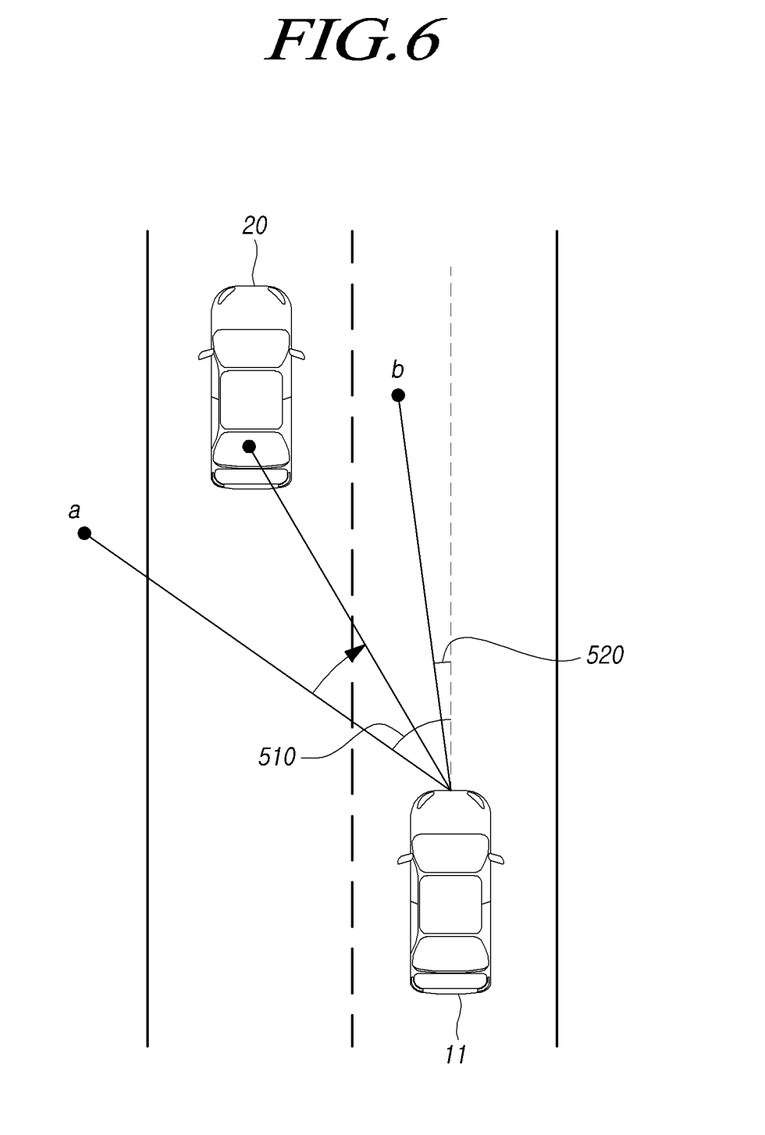

FIGS. 5 and 6 are views illustrating an example of calibrating a first angle 510 by comparing the first angle 510 and a second angle 520 according to an embodiment.

Referring to FIG. 5, the controller 140 may calibrate the first angle 510 by comparing the first angle 510 and the second angle 520 estimated by the angle estimator 130. Specifically, a of FIG. 5 is the position of the object 20 estimated in a single frame, and the angle formed from a of FIG. 5, forward of the host vehicle 11, may be defined as the first angle 510. Further, b of FIG. 5 may be the position of the object 20 estimated in a plurality of frames, and the angle formed from b of FIG. 5, forward of the host vehicle 11 may be defined as the second angle 520. If the difference between the first angle 510 and the second angle 520 respectively estimated in a single frame and multiple frames is a threshold or more, the controller 140 may determine that the first angle 510 has been wrong detected and calibrate the first angle 510 to the second angle 520.

Referring to FIG. 6, if the difference between the first angle 510, which is the angle between a of FIG. 6, which is the position of the object 20 estimated in a single frame, and the host vehicle 11, and the second angle 520, which is the angle between b of FIG. 6, which is the position of the object 20 estimated in multiple frames, and the host vehicle 11, is less than the threshold, the controller 140 may calibrate the first angle 510 to an intermediate value between the first angle 510 and the second angle 520.

The above-described threshold may be varied depending on the velocity of the host vehicle 11, driving road, the driver's driving type, or other ambient environments.

Further, the calibration of the first angle 510 is not affected by the value of the second angle 520 as compared with the second angle 520. For example, if the difference between the first angle 510 and the second angle 520 is less than the threshold, the first angle 510 may be maintained as the existing angle without calibration.

The radar device 10 of the disclosure may be implemented as an electronic control unit (ECU). The ECU may include at least one or more of one or more processors, a memory, a storage unit, a user interface input unit, or a user interface output unit which may communicate with one another via a bus. The ECU may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Described below is a radar control method using the radar device 10 capable of performing the above-described embodiments of the disclosure.

Figure 7:
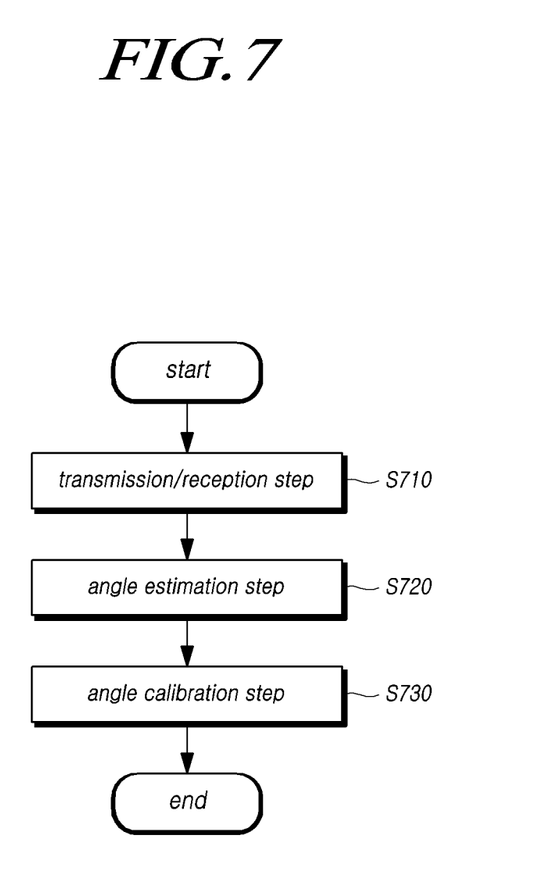
FIG. 7 is a flowchart illustrating a radar control method according to an embodiment of the disclosure.

FIG. 7 is a flowchart illustrating a radar control method according to an embodiment of the disclosure.

Referring to FIG. 7, according to the disclosure, a radar control method may comprise a transmission/reception step S710 controlling to transmit a frequency-modulated transmission signal and receive a reception signal which is the transmitted transmission signal reflected by an object 20, an angle estimation step S720 estimating a first angle 510 for a position of the object 20, with respect to a host vehicle, during one frame, based on a result obtained by performing fast Fourier transform (FFT) on the reception signal and estimating a second angle 520 which is a virtual angle for the position of the object 20 during a plurality of frames, and an angle calibration step S730 calibrating the first angle 510 by comparing the estimated first angle 510 and the estimated second angle 520.

The angle estimation step S720 may obtain a range-velocity index for the reception signal and estimate the first angle 510 and the second angle 520 for the object 20 based on the range-velocity index.

Figure 8:
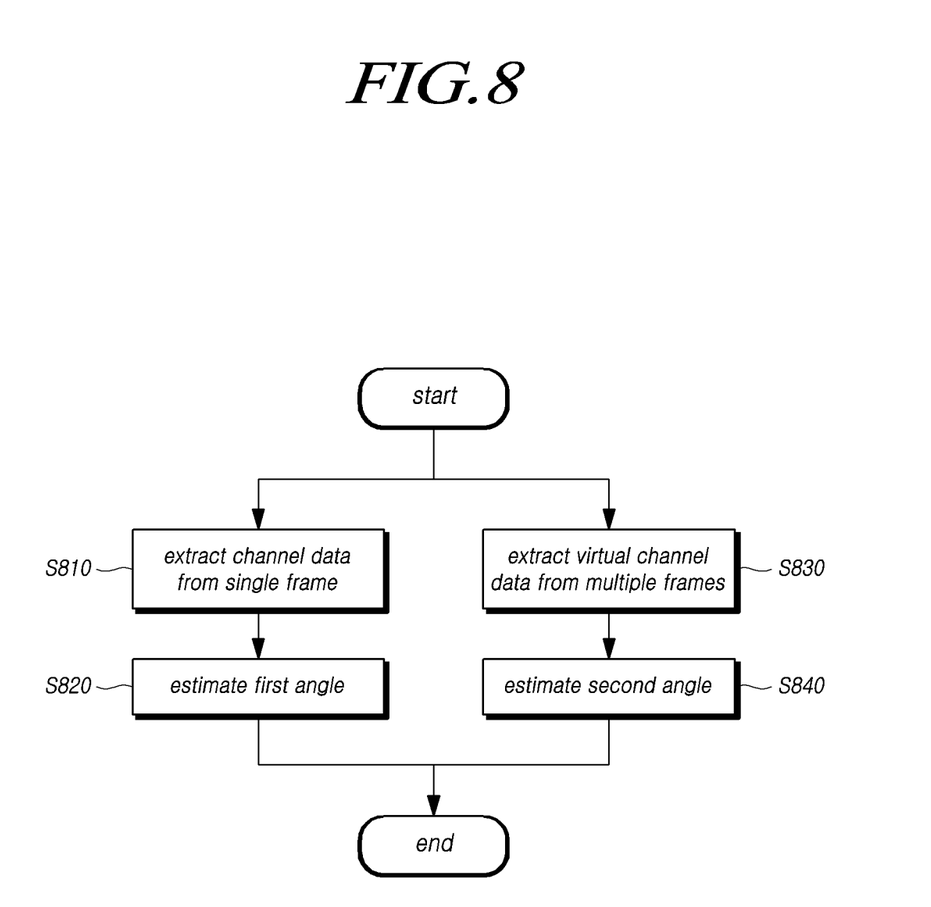
FIG. 8 is a view more specifically illustrating step S720 according to an embodiment.

FIG. 8 is a view more specifically illustrating step S720 according to an embodiment.

The radar device 10 may extract channel data from a single frame (S810). The radar device 10 may receive a reception signal, calculate the range-velocity index through FFT, and calculate the range-velocity index per frame. The radar device 10 may extract channel data corresponding to the range and velocity index in a single frame.

The radar device 10 may estimate the first angle 510 based on the extracted channel data (S820). The radar device 10 may estimate the angle for the object 20 based on the measurement 410 included in a preset object candidate area 420 among the measurements 410 included in the received reception signal.

The radar device 10 may extract virtual channel data from a plurality of frames (S830). The radar device 10 may receive a reception signal and may extract virtual channel data, which is a set of channel data extracted for each frame. The number of channel data included in the virtual channel data may correspond to the number of the plurality of frames. The plurality of frames may be set to a different number according to the driving velocity, driving course, driving place, and the like. For example, if the driving velocity of the host vehicle 11 is high so that quick response is required, the radar device 10 may set the plurality of frames to three to five frames and, if the driving course is a curved or precise information, rather than a quick response, is needed, the radar device 10 may set the plurality of frames to 10 to 15 frames.

The radar device 10 may estimate the second angle 520 based on the extracted virtual channel data (S840). The second angle 520 may be an average of angles for each object 20 estimated from a plurality of channel data included in the virtual channel data or may be an average of weighted angles which are obtained by giving a weight to each channel data according to a preset reference. For example, the channel data extracted from the last frame may be set to have the highest weight.

Figure 9:
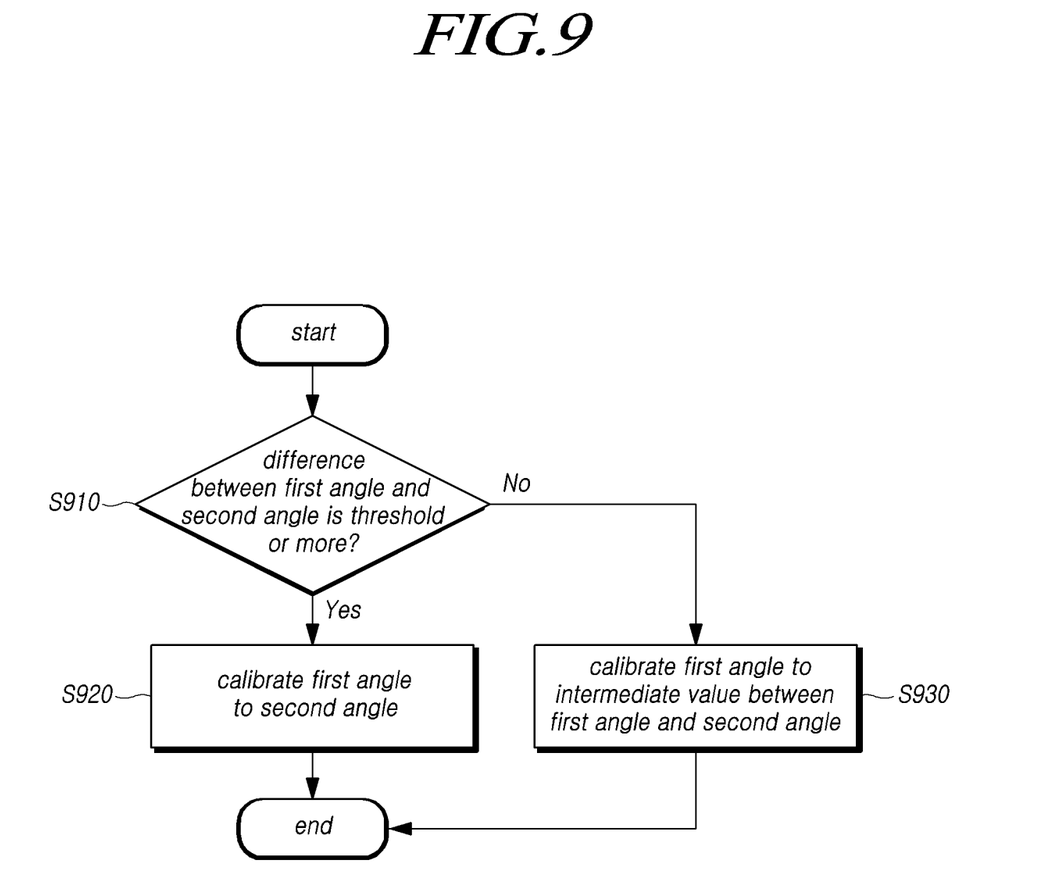
FIG. 9 is a view more specifically illustrating step S730 according to an embodiment.

FIG. 9 is a view more specifically illustrating step S730 according to an embodiment.

Referring to FIG. 9, the radar device 10 may determine whether the difference between the estimated first angle 510 and second angle 520 is a threshold or more (S910). The radar device 10 may estimate the first angle 510 from the channel data extracted from a single frame and may estimate the second angle 520 from the virtual channel data extracted from a plurality of frames.

If the difference between the estimated first angle 510 and second angle 520 is the threshold or more (Yes in S910), the radar device 10 may calibrate the first angle 510 to the second angle 520 (S920). Since the second angle 520 is an angle estimated from the plurality of frames, the second angle 520 may be determined to have relatively higher reliability than the first angle 510 due to accumulation of data. Further, since the unit of frame is about 50 ms, the range in which the object 20 may be moved within a single frame is limited. Thus, if the difference between the first angle 510 and the second angle 520 is the threshold or more, the radar device 10 may determine that the first angle 510 has an error in the process of estimation or measurement and calibrate the first angle 510 to the second angle 520.

If the difference between the estimated first angle 510 and second angle 520 is less than the threshold (No in S910), the radar device 10 may calibrate the first angle 510 to an intermediate value between the first angle 510 and the second angle 520 (S930). In an embodiment, rather than calibrating the first angle 510 depending on the threshold, if the number of measurements in the object candidate area 420 is a reference value or more, the radar device 10 may refrain from calibrating the first angle 510 irrespective of the difference between the first angle 510 and the second angle 520.

As described above, according to the disclosure, the radar device and the control method may enhance the accuracy for the first angle 510 by comparing the first angle 510 estimated from a single frame and the second angle 520 estimated from a plurality of frames to thereby calibrate the first angle 510.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar device, comprising:
    a transmitter controlling to transmit a frequency-modulated transmission signal;
    a receiver receiving a reception signal which is the transmitted transmission signal reflected by an object;
    an angle estimator estimating a first angle for a position of the object, with respect to a host vehicle, during one frame, based on a result obtained by performing fast Fourier transform (FFT) on the reception signal and estimating a second angle which is a virtual angle for the position of the object based on the results obtained by performing FFT on the reception signals during a plurality of frames; and
    a controller calibrating the first angle by comparing the estimated first angle and the estimated second angle,
    wherein the frame is defined as a time period from a transmission of the transmission signal to a retransmission of the transmission signal after analyzing the reception signal reflected by the object, and
    wherein the number of the frames for estimating the second angle is differently set according to at least one of a driving velocity, a driving course and a driving place of the host vehicle.

2. The radar device of claim 1, wherein the angle estimator calculates a range-velocity index for the reception signal and estimates the first angle and the second angle for the object based on the range-velocity index.

3. The radar device of claim 1, wherein the angle estimator estimates an angle for the object based on a measurement included in a preset object candidate area among measurements included in the received reception signal.

4. The radar device of claim 1, wherein the frame is a time from the transmission of the transmission signal to retransmission of the transmission signal after analyzing the reception signal reflected by the object and received, and receiving information for the reception signal.

5. The radar device of claim 1, wherein the second angle is an average of angles for the object estimated in each of the plurality of frames.

6. The radar device of claim 5, wherein the controller calibrates the first angle to the second angle.

7. The radar device of claim 5, wherein the second angle is an average calculated by excluding a largest angle and a smallest angle among angles estimated in each of the plurality of frames.

8. The radar device of claim 1, wherein the controller calibrates the first angle to the second angle if a difference between the first angle and the second angle is a threshold or more.

9. The radar device of claim 1, wherein the controller calibrates the first angle to an intermediate value between the first angle and the second angle if a difference between the first angle and the second angle is less than a threshold.

10. The radar device of claim 1, wherein if the plurality of frames include N frames, and an angle for the object estimated in each of an Nth frame, an N−1th frame, and an N−2th frame is increased or decreased while maintaining a predetermined value, the angle estimator estimates an angle for the object estimated in the Nth frame as the second angle.

11. A radar control method, comprising:
    a transmission/reception step controlling to transmit a frequency-modulated transmission signal and receive a reception signal which is the transmitted transmission signal reflected by an object;

an angle estimation step estimating a first angle for a position of the object, with respect to a host vehicle, during one frame, based on a result obtained by performing fast Fourier transform (FFT) on the reception signal and estimating a second angle which is a virtual angle for the position of the object based on the results obtained by performing FFT on the reception signals during a plurality of frames; and an angle calibration step calibrating the first angle by comparing the estimated first angle and the estimated second angle, wherein the frame is defined as a time period from a transmission of the transmission signal to a retransmission of the transmission signal after analyzing the reception signal reflected by the object, wherein the number of the frames for estimating the second angle is differently set according to at least one of a driving velocity, a driving course and a driving place of the host vehicle.

12. The radar control method of claim 11, wherein the angle estimation step calculates a range-velocity index for the reception signal and estimates the first angle and the second angle for the object based on the range-velocity index.

13. The radar control method of claim 11, wherein the angle estimation step estimates an angle for the object based on a measurement included in a preset object candidate area among measurements included in the received reception signal.

14. The radar control method of claim 11, wherein the frame is a time from the transmission of the transmission signal to retransmission of the transmission signal after analyzing the reception signal reflected by the object and received, and receiving information for the reception signal.

15. The radar control method of claim 11, wherein the second angle is an average of angles for the object estimated in each of the plurality of frames.

16. The radar control method of claim 15, wherein the angle calibration step calibrates the first angle to the second angle.

17. The radar control method of claim 15, wherein the second angle is an average calculated by excluding a largest angle and a smallest angle among angles estimated in each of the plurality of frames.

18. The radar control method of claim 11, wherein the angle calibration step calibrates the first angle to the second angle if a difference between the first angle and the second angle is a threshold or more.

19. The radar control method of claim 11, wherein the angle calibration step calibrates the first angle to an intermediate value between the first angle and the second angle if a difference between the first angle and the second angle is less than a threshold.

20. The radar control method of claim 11, wherein if the plurality of frames include N frames, and an angle for the object estimated in each of an Nth frame, an N−1th frame, and an N−2th frame is increased or decreased while maintaining a predetermined value, the angle estimation step estimates an angle for the object estimated in the Nth frame as the second angle.

* * * * *